United States Patent [19]

Rittenbach

[11] 4,219,812
[45] Aug. 26, 1980

[54] RANGE-GATED PULSE DOPPLER RADAR SYSTEM

[75] Inventor: Otto E. Rittenbach, Neptune, N.J.

[73] Assignee: The United States of America as represented by the Secretary of the Army, Washington, D.C.

[21] Appl. No.: 973,356

[22] Filed: Dec. 26, 1978

[51] Int. Cl.² ............................................. G01S 9/02
[52] U.S. Cl. ................................. 343/7.3; 343/5 DP
[58] Field of Search ............................ 343/7.3, 5 DP

[56] References Cited

U.S. PATENT DOCUMENTS 4,124,850  11/1978  Frazier, Jr. .......................... 343/7.3

Primary Examiner—Malcolm F. Hubler
Assistant Examiner—Richard E. Berger
Attorney, Agent, or Firm—Nathan Edelberg; Jeremiah G. Murray; Daniel D. Sharp

[57] ABSTRACT

A range-gated radar system which includes a phase modulator that modulates an r.f. generator with a signal which may be binary coded. In a preferred embodiment, the binary signal is a periodic signal of $2^N-1$ bits per period. Starting at some arbitrary point in the sequence, K contiguous bits are transmitted then M contiguous bits are passed over, then K more bits are transmitted, and so on. The quantities $M+K$ and $2^N-1$ have no primary factors in common. The radar system may be a doppler radar system using balanced digital processing which involves separating the upper and lower sideband components of modulation that exist in the return radar signal as a result of the motion of scatterers and subtracting them.

7 Claims, 6 Drawing Figures

RANGE-GATED PULSE DOPPLER RADAR SYSTEM

GOVERNMENT LICENSE

This invention may be manufactured by or for the Government, for governmental purposes, without the payment of any royalties thereon or therefor.

TECHNICAL FIELD

Broadly speaking, this invention relates to radar. More particularly, in a preferred embodiment, this invention relates to a radar system which transmits a binary, phase-encoded waveform of increased duty-cycle.

BACKGROUND OF THE INVENTION

As is well known, modern jungle warfare dictates that portable military radar systems be lightweight, rugged, and low in power consumption. Such requirements suggest the use of solid state radars employing phase-encoded transmissions of high duty cycle. In particular, the use of pseudo-random codes is suggested because such codes possess the high duty cycle wanted yet do not require amplitude shaping. Unfortunately, heretofore the only practical systems which were constructed used either a short code sequence or a long code sequence that was broken down into component parts that were factors of the overall code sequence. In the former case, the time sidelobes of the pulse sequence's autocorrelation function were marginal while in the latter case, time sidelobes of an unacceptably high level were introduced for signals returned from nearby targets.

SUMMARY OF THE INVENTION

As a solution to the above and other problems, the instant invention comprises a range-gated, doppler bank, pulse doppler radar system including a directional antenna. The system includes a source of r.f. energy, an r.f. power amplifier having an input connected to the r.f. energy source and an output connected to the antenna, and a source of a coded binary signal. The system further includes means for phase-modulating the r.f. input signal to the power amplifier with the coded binary signal characterized in that the source of a coded binary signal includes means for generating a periodic binary bit sequence having $2^N-1$ bits per period, and means for selecting K contiguous bits from said sequence starting at some arbitrary point in the sequence.

The invention and its mode of operation will be more fully understood from the following detailed description when taken with the appended drawings, in which:

The invention will now be described with reference to an illustrative 212 MHz, coherent, range-gated/doppler bank, pulse-doppler radar system that transmits a high duty cycle coded waveform and performs correlation detection in the receiver. Twenty-seven range bins of 10 meters resolution are processed to cover 30 to 300 meters in the normal mode. An extended range mode processes the range interval of 490 to 760 meters. Azimuth coverage of about 100° is provided by two squinted 55° beamwidth antennas that are used in a sequential lobing technique to provide ±10° azimuth beam splitting accuracy. The doppler bank, balanced processing, adaptive threshold control and detection/decision functions are optimized for detection of targets in dense foliage and are implemented digitally in a general purpose computer. The display is in the form of a row of lamps, one lamp for each range bin. An aural alarm is included for non-visual monitoring. In addition, the radar operator can select any range bin of interest for measurement and display of target azimuth and doppler, including doppler direction. One skilled in the art will appreciate, however, that the invention has broader application and is not limited to the illustrative system shown.

Figure 1:
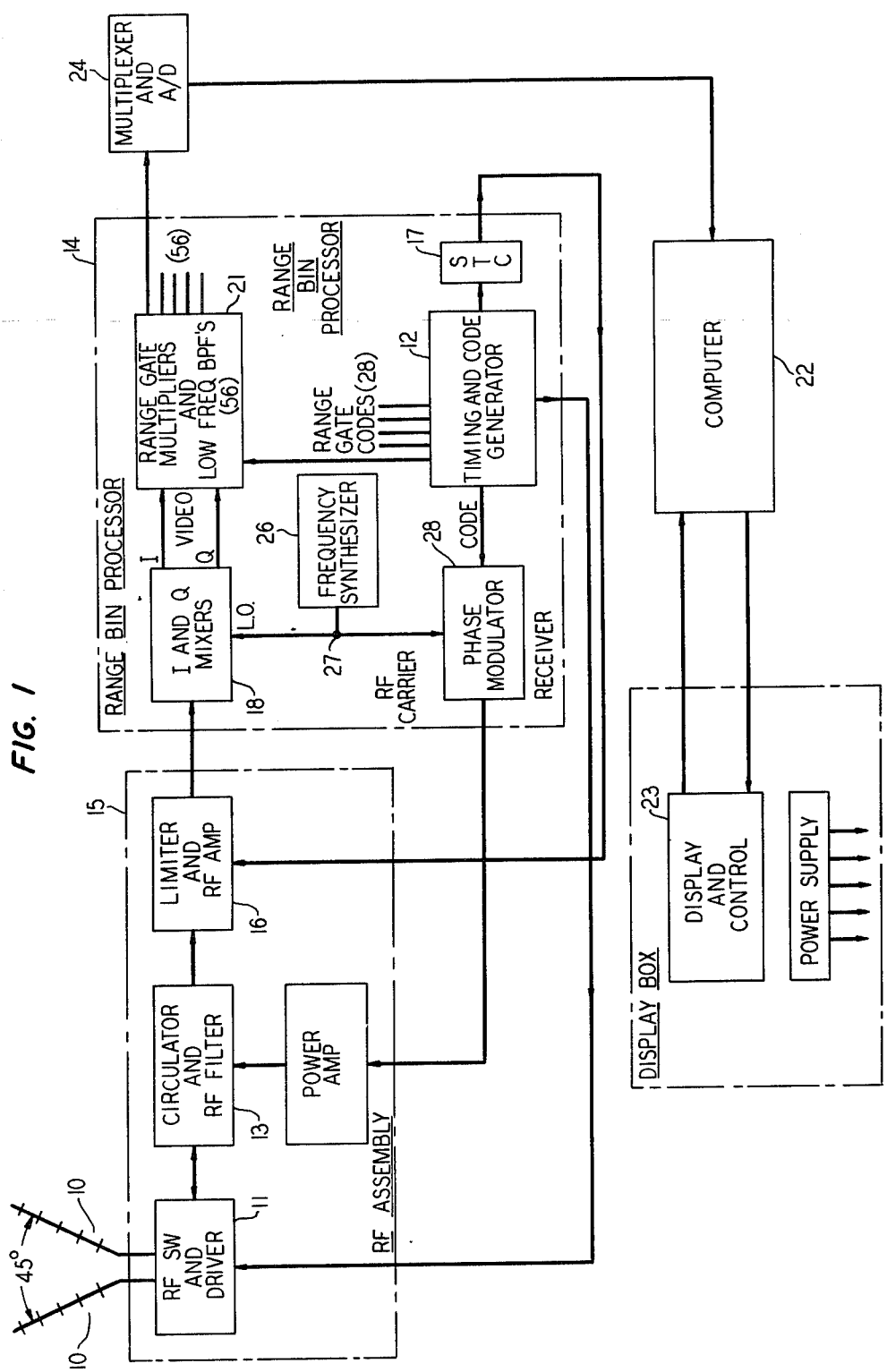
FIG. 1 is a block schematic diagram of an illustrative radar system according to the invention.

An overall block diagram for the illustrative radar system is depicted in FIG. 1. As shown, two horizontally polarized, 212 MHz log-periodic antennas 10 are used. These antennas are alternately switched into the system in order to implement a sequential lobing azimuth beam splitting technique. The switching is done by means of a SPDT r.f. switch 11 driven by signals derived from a timing and code generator 12. A 30 MHz bandwidth (60 dB points) bandpass filter 13 is connected to switch 11 to truncate the bandwith of the transmitted signal and to keep out-of-band signals out of the receiver 14. A 4-port circulator is associated with filter 13 and used as a duplexing device between transmitter 15 and receiver 14 while a limiter 16 provides burnout protection against strong signals for the r.f. amplifier front end.

A low noise r.f. amplifier associated with limiter 16 provides sufficient gain to establish the overall noise figure needed for the required sensitivity. The gain is also compatible with the large signals expected, thereby maintaining unsaturated operation at these points.

The low noise gain stages in the r.f. amplifier are followed by a voltage controlled variable attenuator 17 which will be used to manually adjust the receiver gain, depending upon the strength of the signals being returned and also to implement sensitivity time control.

At the output of r.f. amplifier 16, the received signal is split into two channels, I and Q, to implement balanced processing. Each mixer in detector 18 is a synchronous detector that beats the incoming signal down to video.

Each channel of the detector feeds a video amplifier and phase equalizer (not shown), the latter being used to shape the signal prior to correlation. The video signals are then applied in parallel to 27 range bin correlators 21 for each channel and to the additional correlators used for direction finding, making a total of 56. The latter correlators can be switched by the operator to any one of the 27 range bins of interest, enabling a signal amplitude comparison to be made on each antenna at a selected range, thereby providing azimuth information to a computer 22 for ultimate display on a display unit 23.

The video signal appearing at the input to each multiplier 21 is multiplied by the correct coded signal for that particular range. The output of the multiplier is a constant amplitude signal, lasting for the length of the code in each transmission period, if the return is from a target at that range. Returns from targets at the other ranges that overlap into another range bin will be uncorrelated and produce positive and negative components during the multi-bit code length at the multiplier output. A correct range moving target produces pulses at the multiplier output that vary in amplitude, pulse-to-pulse, in conformance with the doppler frequency.

From this point, the signals are sent through a low frequency bandpass filter (not shown), where the components in the doppler band will be extracted, thence to a multiplexer 24.

The 56 analog signal channels are terminated at the input to multiplexer 24. The computer 22 commands multiplexer 24 to sequentially sample, and convert to digital format, all 56 channels at a rate of twenty-eight times per second per channel. This rate is two and one-half times the highest frequency passed by the analog low pass filters. The digital words representing the sampled signal amplitude are processed in a digital doppler filter bank. The outputs of the filters are utilized in a clutter cancelling balanced process and fed to the detection threshold. When the threshold is exceeded 3 out of 5 hits, the computer 22 lights a display lamp. The output of the computer consists of a series of contact closures used to turn on a light on the display 23, indicating at which range the target is located. By means of a thumbshell switch control, a range can be selected for further target information, i.e. the target's azimuth, velocity, and direction as indicated by a light for each case.

In order to achieve stability, the transmitted signal is derived from a crystal oscillator 26, multiplied up to the transmitted frequency. A power divider 27 sends half the power to the mixers 18 in the balanced processor and the other half to a phase modulator 28 wherein the multi-bit 0° or 180° code modulates the r.f. signal.

All the timing in the system is derived from a stable MHz crystal clock. The timing generator contains the circuits necessary to generate a 255 bit M code, the shift registers used to delay the code an amount corresponding to the correct return from each of the 27 range bins, and the gates necessary to select the proper number of bits for the transmitter and for each range bin correlator. As the coded signal is in binary form, operation of the system requires the transmitted signal and the code to each correlator to have 3 states: off, +1 (or 0°), and −1 ( or 180°). This latter function is accomplished in a trinary generator which accepts the binary code and its associated gate and by uniquely combining them, generates the 3 level code.

Figure 2:
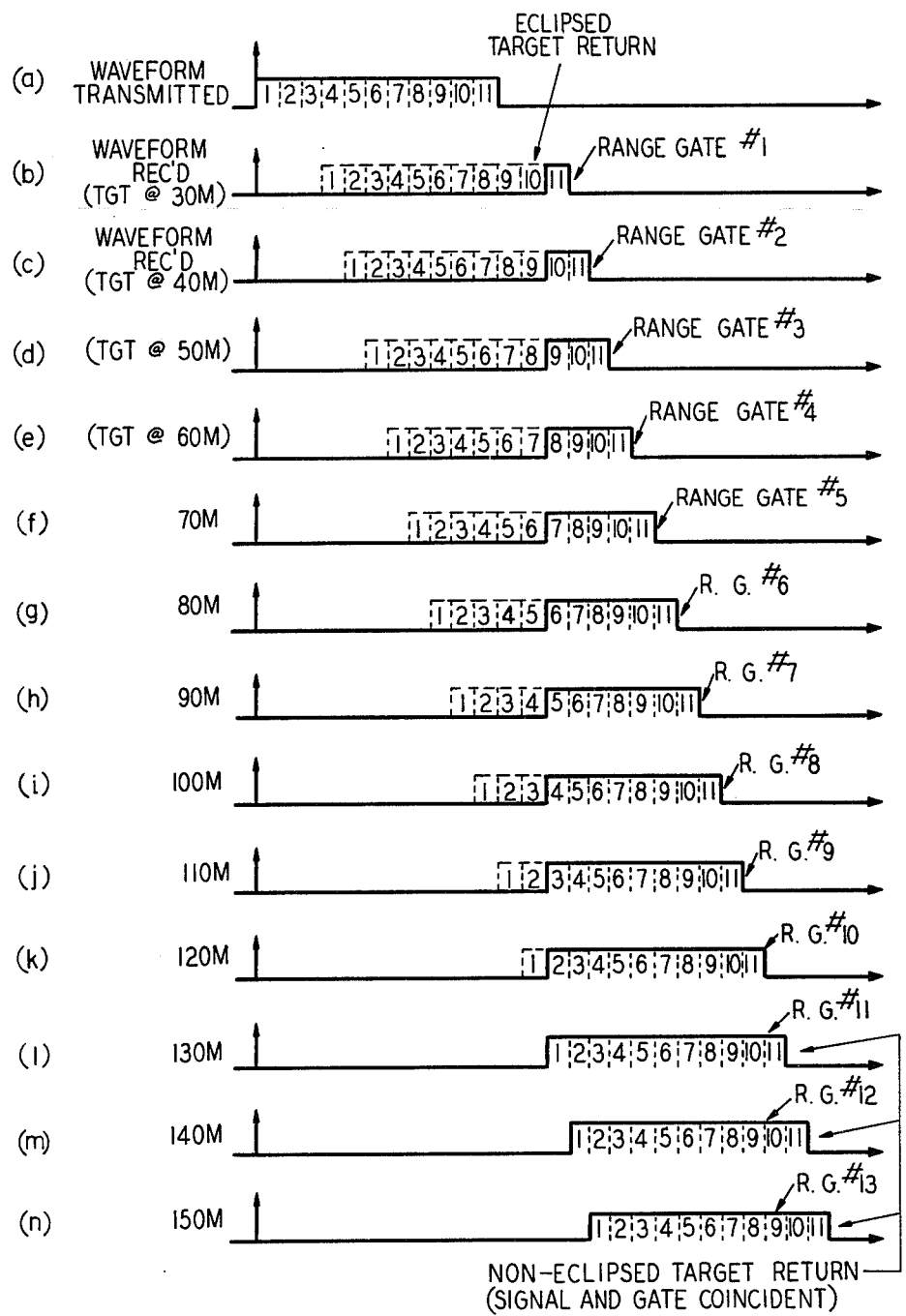
FIG. 2 is a graph depicting the various coded sequences found in the system shown in FIG. 1.

Turning now to FIG. 2, it will be seen that the above described radar system transmits a binary, phase-coded waveform. The choice of a coded waveform for such a system is based primarily on two factors. One is that a low level, high duty-cycle transmission is less susceptible to enemy interception while retaining the resolution and detection performance of an equal energy, high peak power, simple pulse. The second is that the high duty-cycle transmission is also a better match for solid state transmitter design and results in a lower cost, smaller size, high reliability transmitter. The additional equipment complexity associated with the use of a coded waveform is small relative to the above-stated benefits. In the illustrative embodiment, the basic code used is a 255-bit maximum length binary sequence generated by an eight stage shift register with feedback taps. However, the radar system transmits 11-bit bursts selected from the continuously running sequence generator, with a separation of 81 bits between each transmission. After 255 11-bit transmission, all having different sequences, the waveform repeats itself.

This novel mode of transmission has several unique benefits. First, it combines the good autocorrelation function properties of the CW maximum length sequence with the desirability of pulsed radar. Second it has the property that near range targets whose returns are eclipsed by the 11-bit transmission, produce codes that have low side-lobe correlation functions. This eclipsing reduces the processed amplitude of near range targets and acts as a partial built-in sensitivity time control; and in addition, since the code changes pulse-to-pulse, multiple time-around echoes are very effectively suppressed.

A maximum length shift register (M) sequence can be used to directly modulate the phase of a continuous-transmission type of radar. However, the leakage from transmitter to receiver in a practical system of this type can be intolerable under some circumstances. One of the important assets of this invention was the realization that the M-sequence could be broken up into short subsequences which could be transmitted at some repetition rate to gain the advantages of a pulsed radar without losing the low side-lobe benefits of the M-sequence autocorrelation function.

With modulo 2 addition of the output of certain selected stages, it was also discovered that an N-stage binary shift register can be used to generate M sequences. The sequences generated in this manner are periodic with $2^N-1$ bits per period. For an 8-stage shift register, 16 PN sequences can be generated with 255 bits per period by utilizing different combinations of feedback taps. All M-sequences have autocorrelation functions which peak to a relative value of $2^N-1$ when the bit sequences line up and have a relative value of $-1$ for all other displacements of the sequences. Since the M-sequences are periodic, the autocorrelation function is also periodic.

Since the autocorrelation function for M-sequences from an N-stage shift register has a peak-to-sidelobe ratio of $2^N-1$, it was a goal to have approximately the same characteristics from any new code generated from the PN sequences. In other words, there should be as many as K-bit vectors in the transmitted code word vocabulary as there are bits in the sequence.

One method of selecting the transmitted words from a PN sequence is to select K contiguous bits from the sequence starting at some arbitrary point in the sequence, then, after waiting some desired length of time, the next K contiguous bits of the sequence are selected for transmission. This process is continued as long as transmission is desired. The second method of generating the code words for transmission is to select K contiguous bits from the PN sequence, starting at some arbitrary point in the sequence; then pass over the next M contiguous bits before selecting the next K-bit word. This process is continued as long as transmission is desired. The question that must be answered is, what values of K in the first method and of K+M in the second method can be used to generate a vocabulary of K-bit words which have at least as good an autocorrelation function as the PN sequence. A necessary condition for a good code selection is that as many K-bit words are in the vocabulary as there are bits in the PN sequence.

Since the first method can be solved from the second method by taking M as zero, only the second method is considered. Clearly, when some integer multiple ($\mu$) of K+M is equal to some other integer multiple (V) of $2^N-1$, the code words will begin repeating. Therefore, the number of code words in the vocabulary would be $\mu$. The ratio that must be examined is the following:

$$\mu/V = 2^N - 1/K + M; \mu, V \text{ integers.}$$

Since the desired number of code words is $2^N-1$, the condition for a suitable code is that K+M and $2^N-1$ form an irreducible ratio. Therefore, $2^N-1$ and K+M must not have common primary factors. An 8-stage register has PN sequences of 255 length. The prime factors of 255 are 3, 5 and 17. If, for example, the value of K=11 and M=81 were being tested, the primary factors of K+M=92 must not be common to 255 (3, 5, 17). The primary factors of 92 are 2, 4 and 23. Therefore, the condition is satisfied. Since the starting bit is arbitrary and the number of code words is $2^N-1$, the $k^{th}$ bit of the code word must take on the value of each bit in the PN sequence once and only once for all values of k from 1 to K. The validity of this statement is evident from examining the first bit of each word. If the first bit in the word took on the value of the same bit in the PN sequence more than once, those words would be identical because of the method of selection. Since $2^N-1$ different words are in the vocabulary, the first bit must take on the value of every bit in the PN sequence once and only once. The validity of the statement for other bit positions follows immediately because of the rules of selection.

Since the K-bit words are formed from contiguous bits in the PN sequence and every bit value of the PN sequence is acquired once and only once at each bit position in the K-bit word, it is evident that the autocorrelation function will have a peak value of $K(2^N-1)$, a one bit slip value of $-(K-1)$, and a k-bit slip value of $-(K-k)$ where k=1, 2, ..., K-1. It has been assumed that M>K for the autocorrelation values. This autocorrelation function is better than the M-sequence autocorrelation function on the basis of less than one word slippage.

Clearly, when K+M is considerably smaller than $2^N-1$, the first, second and possibly more time-around echoes have good correlation properties. Therefore, the code selected must be carefully examined to insure that multiple time-around echoes do not produce large correlation function values for the largest anticipated time delay. For the sample previously, K=11, M=81, and $2^N-1=255$, the correlation properties were examined out to a 50-word slip. The first significant pop-up of the correlation function occurs for an 11-word, 8-bit slip. The second pop-up occurs for a 36-word, 3-bit slip. These auxiliary peaks in the correlation function are of negligible consequence because they occur at distances of 11 times and 36 times the normal radar range. At these ranges, the $4^{th}$ power path loss is greater than the magnitude of the pop-ups. Sensitivity time control provides additional attenuation for most of the range bins.

The 11-bit return echo from a target in the first range bin is eclipsed to a single-bit word. Therefore, the correlating waveform is also a single-bit word. It is clear from the foregoing that each bit position of the original function for the first range bin will be more like the original M-sequence autocorrelation function, namely, a peak value of $2^N-1$ and off-range correlations of $-1$ for all ranges out to the $k^{th}$ range.

Figure 3:
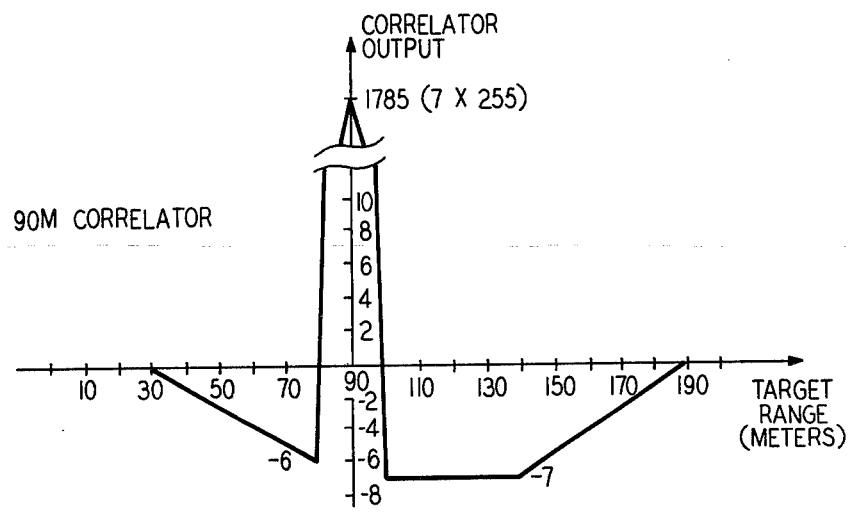
FIGS. 3 and 4 are graphs depicting the correlator output signals for 90 and 130 meter range bins, respectively.
Figure 4:
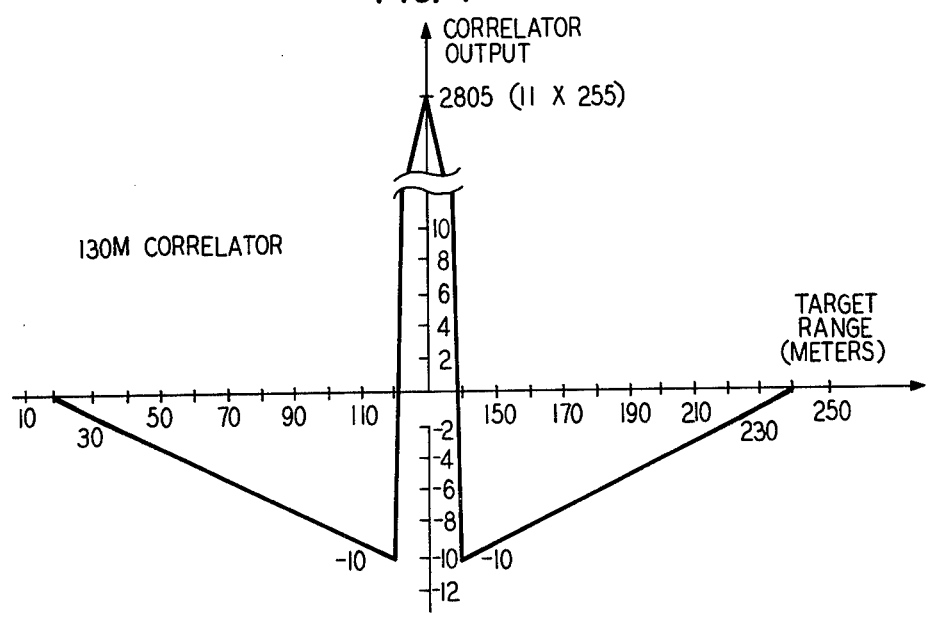

The unique correlation features of this waveform are demonstrated in FIG. 2 which shows the timing of the range gates with respect to the transmitted 11-bit burst. Note that for the 30 meter range processor (range gate #1) (Graph b), the radar receiver processes only one bit of the 11-bit code. The relative phase of that one bit will change, pseudo-randomly, between 0° and 180° pulse-to-pulse and will repeat the coding only after 255 transmissions. The correlator reference signal will convert all received pulses to the same phase and these will be summed to produce a peak of 255. Any other coded sequence entering the processor, as for a target at some other range than the 3rd cell, will add up to a maximum magnitude of 1; 48 dB below the peak. This is true ($-48$ dB maximum sidelobe) for all of the range bin processors. As a typical case, FIG. 3 shows the correlator output for the processor matched to a target at 90 meters range. Note that for a target in any other cell, the correlator output magnitude is at least 48 dB below the peak. This correlation behavior is consistent for all range cell processors, with the "plateau" varying in length for different processors. FIG. 4 shows the autocorrelation function of the waveform, which the correlator outputs follow when the range being processed is 130 meters or greater (no eclipsing). This waveform/processor technique permits an increase in average power by a factor of 11 without increasing the peak power and with negligible ill effects with regard to the masking of small targets by sidelobes from strong targets. Note also, that the peak value for range bins where the target return is eclipsed, goes down as the target range is decreased, providing a modest STC action. Additional sensitivity time control is utilized in a manner similar to conventional methods.

Balanced processing refers to the process of separating the upper and lower sideband components of modulation that exist in the return radar signal as a result of the motion of scatterers, and the process of subtracting them. Signal returns due to scatters having oscillatory motion, if integrated over a long enough time, will have equal energy in the upper and lower sidebands and will therefore be cancelled. Constant doppler speed scatterers (targets) will produce only one sideband in the return signal, and such signals will be unattenuated in the balanced processor.

Figure 5:
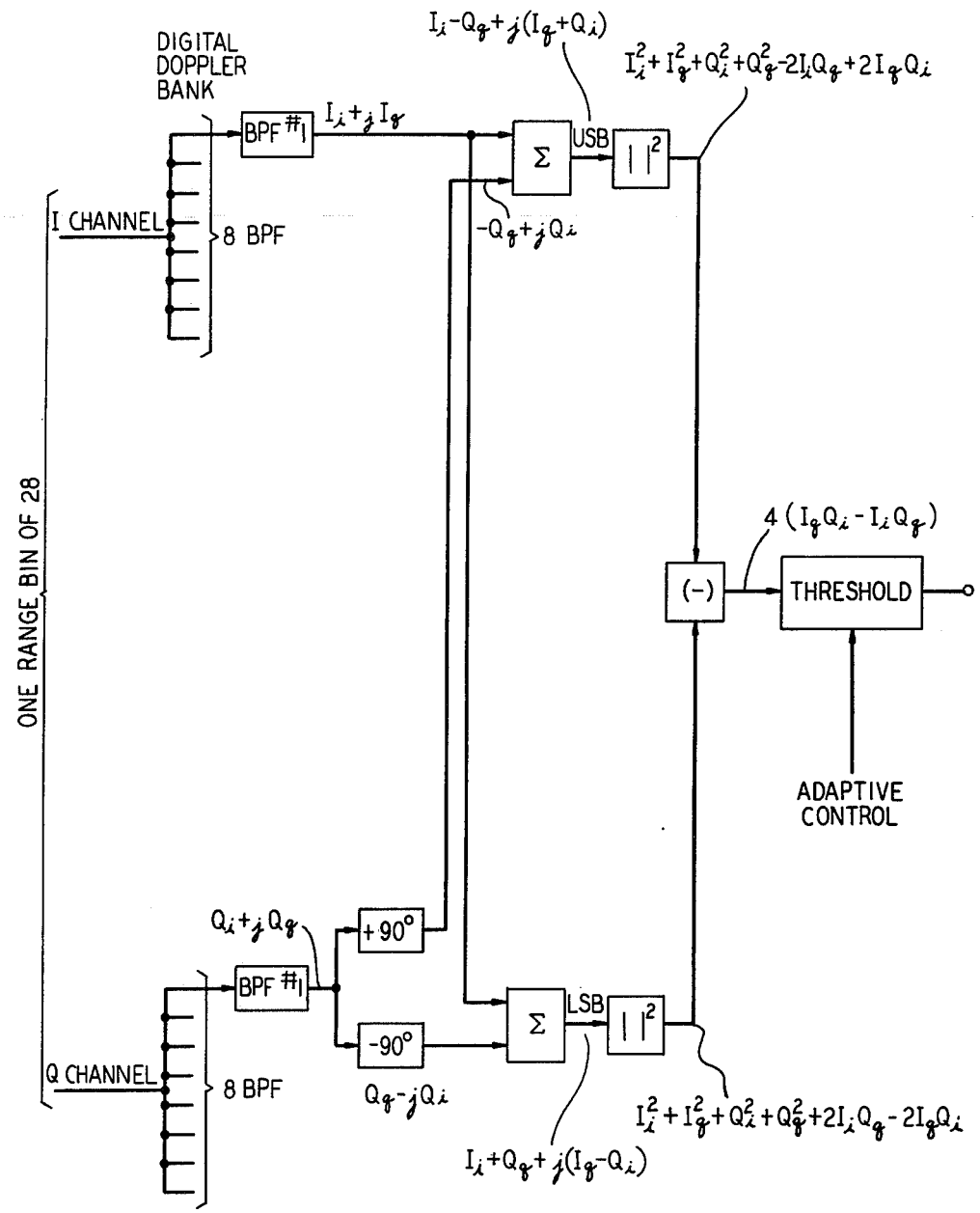
FIG. 5 is a block schematic diagram of an illustrative balanced processor for the system shown in FIG. 1.

FIG. 5 shows how the balanced processor may be implemented. The processing shown is repeated for each range bin. The bank of narrow doppler filters receives the digitized samples from the I and Q channel analog low frequency filters and produces quadrature components of the outputs of each filter in the bank. The output of each filter (one shown) of the Q channel is given a +90° and a -90° phase shift and summed appropriately with the I channel filter output to obtain the upper sideband and lower sideband signals separated. The 90° phase shift can be accomplished in computer 22 by simply interchanging $Q_i$ and $Q_q$ with appropriate signs. This is most convenient when it is recalled that half of these frequencies are below one hertz. The magnitude squared of the upper and lower sideband signals are then obtained and subtracted.

The output of the subtractor is mathematically $4(I_q Q_i - I_i Q_q)$. In the illustrative embodiment, the computer realizes the balanced processor by directly performing the required operations on $I_i$, $I_q$, $Q_i$, $Q_q$.

Since the motion of clutter scatters is not perfectly oscillatory, and the integration time is limited, the cancellation of clutter returns in the balanced processor is imperfect. Thus, thresholds (+ and −) are established to prevent the bipolar clutter residue from causing false alarms. Constant false alarm rate is maintained in a variable clutter environment by implementing, for each range/doppler cell, adaptive control of the threshold. This is done in the illustrative embodiment by having the computer periodically examine the residue for 2 or 3 minutes and setting the threshold a selectable number of dB above the highest peak observed.

As previously mentioned, a target is declared when 3 out of 5 successive "hits" exceed the threshold. If the range cell in which a target detection is made has been selected by a thumb-wheel on the display panel, the doppler speed and direction plus azimuth measurement are fed to the display to light appropriate lamps.

Figure 6:
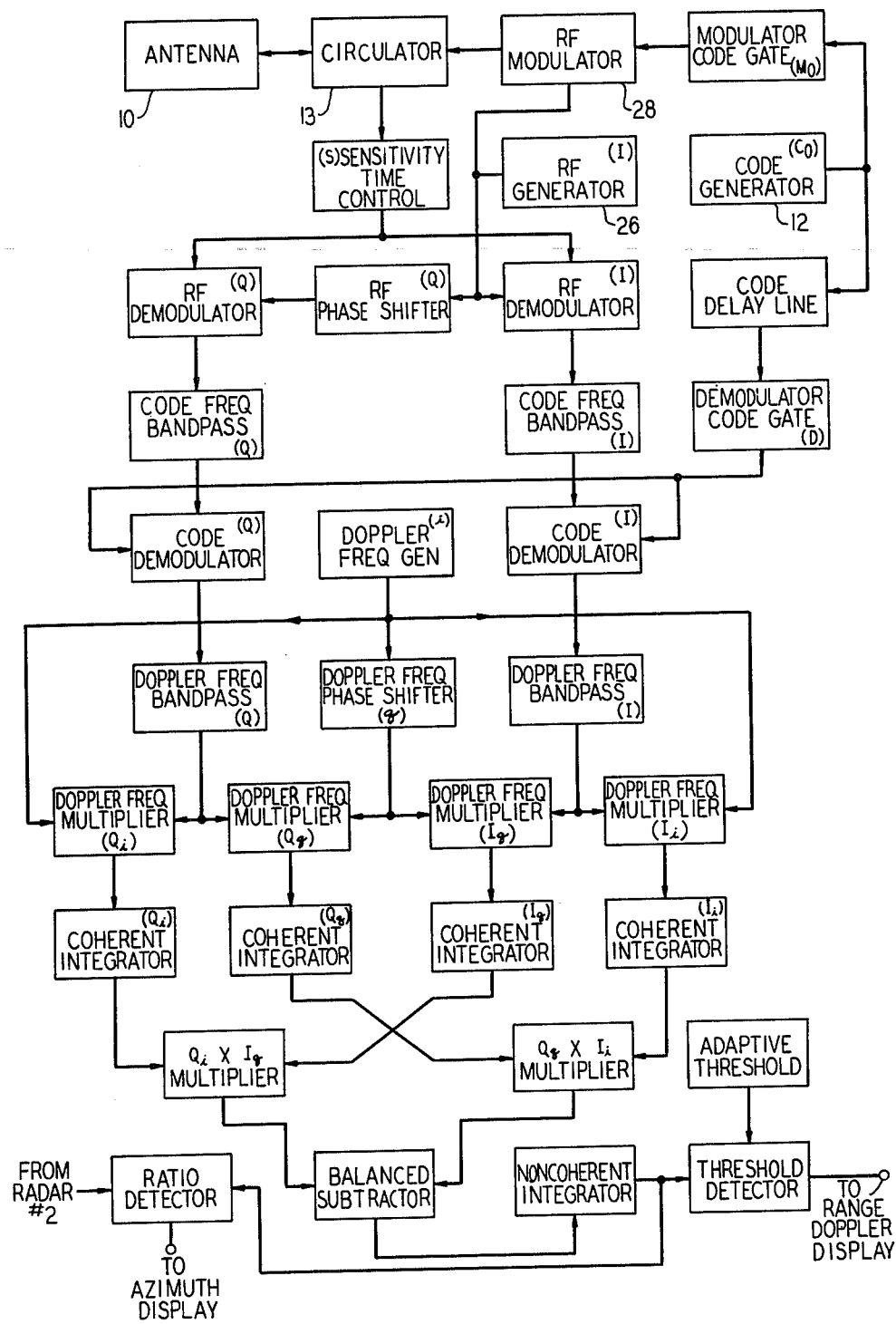
FIG. 6 is a block schematic diagram of a practical implementation of the processor shown in FIG. 5.

Referring to FIG. 6, the continuous pseudo random M-sequence code ($C_o$) generated in the code generator 12 is sampled by the modulator code gate function ($M_o$) to obtain a high duty cycle modulation waveform ($C_oM_o$). This new coding sequence, which results in successive pulses having a different code, modulates the phase of the RF generator output (2 cos $\Omega t$) in a binary fashion. The modulated r.f. signal ($C_oM_o 2 \cos \Omega t$) is passed through the circulator to the radiating antenna 10. The signal, experiencing a one-way attenuation of K, arrives at a target of interest delayed by T: $2KC_TM_T \cos [\Omega(t-T)]$. Assuming that unit size oscillatory clutter, in the vicinity of the target, amplitude modulates the r.f. at a low frequency $\omega$ the resultant signal is $2KC_TM_T \cos \Omega(t-T) \cos(\omega t+\phi)$ which can be written: $KC_TM_T \cos [\Omega(t-T)\pm\omega t\pm\phi]$, a double sideband signal. A target moving with constant doppler velocity would result in +'s only (incoming target) or −'s only (outgoing target) in the ± terms. If small deviation phase modulation were assumed for oscillatory clutter modulation, a similar argument (except for phase) would result. For wide angle modulation, a harmonics of the modulation frequency $\omega$ would appear in the argument. These could be treated similarly.

The return signal received by the Antenna is delayed by T again (now 2T), and can be written $K^2C_{2T}M_{2T}\cos[(\Omega\pm\omega)t+\Phi\pm\phi]$, where $\Phi=-2\Omega T$, the r.f. phase. The signal is routed via the circulator through the sensitivity time control (S) to be demodulated in the RF Demodulators (I, Q). The in-phase channel (I) uses the RF generator as a reference, $K^2C_{2T}M_{2T}S \cos[(\Omega\pm\omega)t+\Phi\pm\phi]\cdot 2\cos\Omega t$, and obtains $K^2C_{2T}M_{2T}S\{\cos[(2\Omega\pm\omega)t+\Phi+\phi]+\cos[\pm\omega t-\Phi\pm\phi]\}$ while the quadrature (Q) channel uses a 90° phase shifted reference out of the RF phase shifter (Q) to obtain:

$K^2C_{2T}M_{2T}S \cos[(\Omega\pm\omega)t+\Phi\pm\phi]\cdot 2 \sin \Omega t = K^2C_{2T}M_{2T}S\{\sin[(2\Omega\pm\omega)t+\Phi\pm\phi]+\sin[\pm\omega t-\Phi\pm\phi]\}$.

The RF demodulator outputs (both I and Q) are filtered in the code frequency band passes I and Q to eliminate the higher beat frequency, are demodulated by the code which has been delayed by code delay line ($C_{2T}$) and gated by the demodulator code gate (D), resulting in $C_{2T}D$. (For target detection, the code delay must equal the target round trip time delay, 2T. Any delay deviating from 2T by as little as 1 code bit width minimizes the code demodulator output.) The code demodulator I and Q outputs are filtered in the doppler frequency band passes I and Q to remove unwanted frequencies. If $K^2C_{2T}M_{2T}SC_{2T}D$ equals 1, then the filtered code demodulator output can be rewritten as:

I channel: $\cos(\omega t\pm\Phi+\phi)$
Q channel: $\pm\sin(\omega t\pm\Phi+\phi)$.

Each output is multiplied by doppler references generated in the Doppler Frequency Generator (i) ($2 \cos \omega t$) and Doppler Frequency Phase Shifter (q) ($2 \sin \omega t$).

| | |
|---|---|
| $I_i$ channel: | $\cos(wt \pm \Phi + \phi) \cdot 2 \cos wt$ |
| | $= \cos(2wt \pm \Phi + \phi) + \cos(\pm \Phi + \phi)$ |
| $I_8$ channel: | $\cos(wt \pm \Phi + \phi) \cdot 2 \sin wt$ |
| | $= \sin(2wt \pm \Phi + \phi) + \sin(\mp \Phi - \phi)$ |
| $Q_i$ channel: | $\mp \sin(wt \pm \Phi + \phi) \cdot 2 \cos wt$ |
| | $= \mp \sin(2wt \pm \Phi + \phi) \mp \sin(\pm \Phi + \phi)$ |
| $Q_8$ channel: | $\mp \sin(wt \pm \Phi + \phi) \cdot 2 \sin wt$ |
| | $= \pm \cos(2wt \pm \Phi + \phi) \mp \cos(\pm \Phi + \phi)$ |

The coherent integrators $I_i$, $I_q$, $Q_i$ and $Q_q$ eliminate the higher beat frequencies. To achieve double sideband cancellation, the proper channels are cross multiplied in the $Q_i \times I_q$ and $Q_q \times I_i$ multipliers and subtracted in the balanced subtractor.

$[\pm\sin(\pm\Phi+\phi)\cdot\sin(\pm\Phi-\phi)]-[\pm\cos(\pm\Phi+\phi)\cdot\cos(\pm\Phi+\phi)]=\pm 1$ For oscillatory clutter there will be equal − and + components, resulting in zero output; while for a unidirectional moving target, the signal will be processed without attenuation.

The output of the balanced subtractor is applied to a noncoherent integrator; the integrated output, in turn, is supplied to a threshold detector which serves to provide a range doppler display.

This output of the noncoherent integrator also goes to a ratio detector for possible amplitude comparison with a similar radar (shifted antenna pattern).

This simplified radar block diagram represents one channel of a multi-channel system. As many as possible of these processes should be time multiplexed for a lightweight radar implementation.

One skilled in the art can make various changes and substitutions to the layout of parts shown without departing from the spirit and scope of the invention.

What is claimed is:

1. A range-gated radar system including an antenna and transmit-receive device which comprises:
   a source of r.f. energy;
   a source of a coded binary signal; and
   means for phase-modulating said r.f. energy source with said coded binary signal;
   said coded binary signal source comprising means for generating a periodic bit sequence having $2^n-1$ bits per period, where N is any integer greater than one;
   means for selecting K contiguous bits from said sequence starting at some arbitrary point in the sequence;
   means for passing over the next M contiguous bits in said sequence wherein $1 \leq K \leq M$ and wherein ($2^N-1$) and (K+M) have no prime factors in common.

2. A range-gated radar system according to claim 1 including a code delay line connected to the output of said coded binary signal source;
   a demodulator code gate responsive to the output of said code delay line;
   an in-phase r.f. demodulator coupled to said source of r.f. energy, the output of which is in phase with said source, and to the return signal from the transmit-receive device received by said antenna; and
   an in-phase code demodulator responsive to the output of said demodulator code gate and to the output of said in-phase r.f. demodulator.

3. A range-gated radar system according to claim 2 including an in-phase code frequency bandpass filter disposed intermediate said in-phase r.f. demodulator and said in-phase code demodulator.

4. A range-gated radar system according to claim 3 including an in-phase doppler bandpass filter coupled to the output of said in-phase code demodulator.

5. A range-gated radar system according to claim 4 including a noncoherent integrator coupled to the in-phase doppler bandpass filter, and a threshold detector in the output of said noncoherent integrator.

6. A range-gated radar system according to claim 4 further including an r.f. phase shifter coupled to said r.f. energy source the output of which is in phase quadrature with said r.f. energy source;
   a quadrature r.f. demodulator connected to the output of said r.f. phase shifter and to said return signal;
   a quadrature code frequency bandpass filter in the output of said quadrature r.f. demodulator;
   a quadrature code demodulator responsive to the output of said demodulator code gate and to the filtered output of said quadrature r.f. demodulator; and
   a quadrature doppler frequency bandpass filter coupled to the output of said quadrature code demodulator.

7. A range-gated radar system according to claim 6 further including a first noncoherent integrator coupled to the in-phase doppler bandpass filter;
   a first threshold detector in the output of said first noncoherent integrator;
   a second noncoherent integrator coupled to the quadrature doppler bandpass filter; and
   a second threshold detector coupled to the output of said second noncoherent integrator.

* * * * *